(12) United States Patent
Matsumoto et al.

(10) Patent No.: US 8,672,385 B2
(45) Date of Patent: Mar. 18, 2014

(54) SEAT LOCKING DEVICE

(75) Inventors: Tadashi Matsumoto, Hamamatsu (JP); Yuichiro Baba, Kosai (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 45 days.

(21) Appl. No.: 13/368,653

(22) Filed: Feb. 8, 2012

(65) Prior Publication Data

US 2012/0251231 A1  Oct. 4, 2012

(30) Foreign Application Priority Data

Mar. 31, 2011 (JP) ................................ 2011-077271

(51) Int. Cl.
*B60N 2/04* (2006.01)
(52) U.S. Cl.
USPC ...................... 296/65.01; 296/65.03; 297/336
(58) Field of Classification Search
USPC .............. 296/63, 69, 64, 65.13, 65.14, 65.16, 296/65.18; 403/326; 297/233, 239, 249, 297/257, 182, 463.2
See application file for complete search history.

(56) References Cited

U.S. PATENT DOCUMENTS

| 7,434,862 | B2 * | 10/2008 | Lutzka et al. | 296/65.03 |
|---|---|---|---|---|
| 7,686,389 | B2 * | 3/2010 | Yamada | 297/15 |
| 2003/0098592 | A1 * | 5/2003 | Nygren et al. | 296/65.09 |
| 2008/0224518 | A1 * | 9/2008 | Yamada et al. | 297/313 |
| 2010/0019526 | A1 * | 1/2010 | Wada et al. | 296/66 |

FOREIGN PATENT DOCUMENTS

JP   2008-63850 A   3/2008

\* cited by examiner

*Primary Examiner* — Glenn Dayoan
*Assistant Examiner* — Sunsurraye Westbrook
(74) *Attorney, Agent, or Firm* — Foley & Lardner LLP

(57) ABSTRACT

A seat locking device includes a striker and a catching section. The catching section includes a base plate including a first entrance concave portion, a cover member including a second entrance concave portion, a latch, a lock plate, and a bumper rubber including a substantially isosceles-triangle portion. A lateral surface of a holding concave portion of the latch is inclined such that an opening side of the lateral surface is located closer to a bottom surface of the first entrance concave portion than its counter-opening side. A bottom surface of the holding concave portion is closer to an imaginary center line of the first entrance concave portion than one lateral surface of the first entrance concave portion so that a catching-capable dimension for the striker is set between the bottom surface of the holding concave portion and another lateral surface of the first entrance concave portion.

4 Claims, 10 Drawing Sheets

SEAT LOCKING DEVICE

BACKGROUND OF THE INVENTION

The present invention relates to a seat locking device, particularly relates to a technique in which a striker fixed to a vehicle body enters an entrance concave portion of a catching means provided in a seat so that the seat is fastened to the vehicle body.

Generally, the state of a seat provided in a vehicle is changed depending on the intended use of an loading space of vehicle. For example, the seat takes a state where an occupant can sit on the seat, or takes a folded state where the loading space of vehicle is usable in various ways. Hence, a seat locking device is used for detachably fixing a seat cushion or a seat back to the vehicle body.

Japanese Patent Application Publication No. 2008-063850 discloses a previously-proposed seat locking device. In this technique, each of a striker entrance groove 11a of an inner plate 11 and a striker entrance groove 12a of an outer plate 12 is set to have a large width dimension in order to absorb variations in entrance positions of a striker 25 in a groove-width direction when the striker 25 enters the striker entrance grooves. The striker 25 is sandwiched between a lateral surface (lower surface in drawings) of a striker holding groove 13d of a hook 13 and a lower surface (in the drawings) of a first damper 21 under a locked state so that a wobbling move of the striker 25 in the striker holding groove 13d is prevented. Moreover, a second damper 22 is provided for relieving an impact by becoming in contact with a spring hanging portion 13f formed in an upper portion of the hook 13 if a large load occurs in a direction that pushes the striker 25 deeply into the striker entrance groove 11a and the striker entrance groove 12a.

SUMMARY OF THE INVENTION

However in the technique disclosed in the above Japanese Patent Application, when the striker 25 is located at an opening-side end (left end of FIG. 2) of the striker holding groove 13d, a distance between the striker 25 and a rotation shaft 13X of the hook 13 takes its maximum value. At this time, a torque about the rotation shaft 13X which is caused in the hook 13 takes its maximum value. Hence, a strength of the hook 13 is designed based on a stress which is applied to the hook 13 when the striker 25 is located at the left end of the striker holding groove 13d. Accordingly, a thickness dimension of the hook 13 becomes large, so that a size of the seat locking device is enlarged.

Moreover, at the time of locking operation, the striker 25 presses the hook 13 so that the hook 13 rotates with the striker 25. Thereby, the hook 13 rotates up to a locked position to engage with a locking member 14. At this time, the first damper 21 is compressed by the striker 25. Hence, a restoring force caused by the compression of the first damper 21 is applied to the striker 25, so that an occupant feels this restoring force as a resistance force against the pushing force (pressing force) for pushing the seat. In this case, since the hook 13 is rotated up to the locked position by the striker 25, it is necessary to push the striker 25 into the striker entrance groove 11a and the striker entrance groove 12a further deeply by a clearance between the striker holding groove 13d and the striker 25 (a difference between a width dimension of the striker holding groove 13d and an outer-diameter dimension of the striker 25). As a distance from the rotation shaft 13X of the hook 13 to a contact point between the striker 25 and the hook 13 becomes longer, it becomes necessary to push the striker 25 more deeply into the striker entrance groove 11a and the striker entrance groove 12a. Therefore, the necessary pushing force varies depending on the location of the striker 25 in the width direction of the striker entrance groove 11a or 12a, so that there is a problem that the pushing force is not stable.

Moreover, the number of components is large because the second damper 22 is provided for stopping an over-stroke (excessive stroke) of the hook 13.

It is an object of the present invention to provide a seat locking device devised to solve or ease the above-mentioned problem.

According to one aspect of the present invention, there is provided a seat locking device comprising: a striker fixed to a vehicle body; and a catching section provided to a seat and configured to catch the striker, the catching section including a base plate which has a first entrance concave portion at an approximately middle location of the base plate, the first entrance concave portion being formed from an outer circumferential portion of the base plate toward an inner side of the base plate, a cover member which is disposed to form an accommodation space between the base plate and the cover member, and which has a second entrance concave portion at an approximately middle location of the cover member, the second entrance concave portion being formed from an outer circumferential portion of the cover member toward an inner side of the cover member, the striker being configured to enter and depart from the first and second entrance concave portions, a latch rotatably provided in the accommodation space by a latch shaft and configured to take a locked position and an unlocked position, the striker being configured to enter the first and second entrance concave portions and a holding concave portion formed in the latch when the latch takes the locked position and configured to depart from the first and second entrance concave portions and the holding concave portion when the latch takes the unlocked position, the holding concave portion being configured to prevent the striker from departing from the first and second entrance concave portions when the latch is in the locked position, a lock plate rotatably provided in the accommodation space by a lock shaft and configured to provide a restricting position for preventing the latch from rotating from the locked position to the unlocked position and a permitting position for permitting the latch to rotate from the locked position to the unlocked position, the latch shaft and the lock shaft being arranged symmetrically to each other with respect to the first entrance concave portion, and a bumper rubber mounted on a bottom surface of the first entrance concave portion of the base plate and configured to relieve an impact when the striker enters the first entrance concave portion, wherein the bumper rubber includes a substantially isosceles-triangle portion at its portion closer to an opening side of the first entrance concave portion, and the substantially isosceles-triangle portion has a vertex located on an imaginary center line of the first entrance concave portion, wherein a lateral surface of the holding concave portion is inclined from an imaginary reference line passing through on a shaft center of the latch shaft and a shaft center of the lock shaft in such a manner that an opening side of the lateral surface of the holding concave portion is located closer to the bottom surface of the first entrance concave portion than a counter-opening side of the lateral surface of the holding concave portion when the latch is in the locked position, wherein a width dimension of the first entrance concave portion is larger than a catching-capable dimension for the striker that is a sum of a catching-capable distance for an imaginary center line of the striker and an outer diameter dimension of the striker, wherein a bottom surface of the holding concave portion is located closer to the imaginary center line of the first entrance concave portion than one lateral surface of the first entrance concave portion so that the catching-capable dimension is set between the bottom surface of the holding concave portion and another lateral surface of the first entrance concave portion, when the latch is in the locked position.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention. Embodiments of seat locking device according to the present invention will be explained below.

(Configuration)

Figure 10:
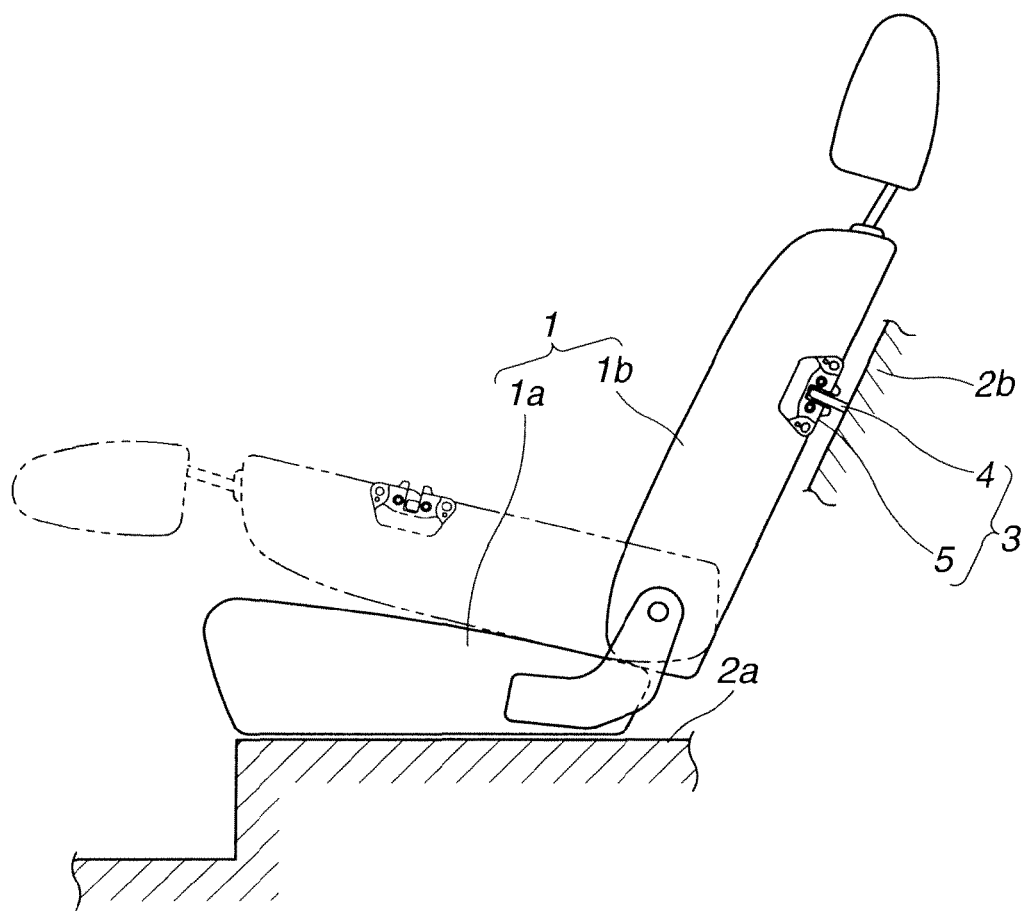
FIG. 10 is a structural view of a seat equipped with the seat locking device according to the embodiment of the present invention.

As shown in FIG. 10, a rear seat 1 is constituted by, i.e., includes a seat cushion 1a and a seat back (backrest) 1b. The seat back 1b is provided rotatably to the seat cushion 1a. The seat cushion 1a is fixed to a vehicle body 2a serving as a floor surface of the vehicle, by bolts (not shown). On the other hand, the seat back 1b is attached to a vehicle body 2b serving as a standing wall surface of the vehicle, so as to be detachable.

A seat locking device (fixing device) 3 is provided for attaching and detaching the seat back 1b to/from the vehicle body 2b. This seat locking device 3 includes a striker 4 and a catching means (catching section) 5. The striker 4 is formed by bending a rod-like member in a U shape and by fixing both ends of this bent rod-like member to the vehicle body 2b. On the other hand, the catching means 5 is provided in a back surface of the seat back 1b in a buried state. The catching means 5 can catch the striker 4 or release the striker 4.

A structure of the catching means 5 will now be explained referring to FIG. 6. The catching means 5 includes a base plate 6, a cover member 7, a latch 8, a lock plate 9, a bumper rubber 10 and the like.

The base plate 6 is formed in a substantially trapezoidal shape. The base plate 6 includes an entrance concave portion (depressed portion) 6a formed from an approximately middle portion of a lower surface of the trapezoidal shape toward an inside of the base plate 6. That is, the base plate 6 is formed with the entrance concave portion 6a extending from an outer circumferential portion of the base plate 6 to an inner side of the base plate 6. The striker 4 enters the entrance concave portion 6a of the base plate 6, and also departs from the entrance concave portion 6a. Moreover, the base plate 6 is formed with a pair of mounting holes 6b for fixing the catching means 5 to the seat back 1b. An accommodation space in which the latch and the like are installed is formed or defined between the base plate 6 and the cover member 7. The cover member 7 includes an entrance concave portion 7a (depressed portion) formed at a location corresponding to the entrance concave portion 6a. That is, the entrance concave portion 7a is formed in an approximately middle portion of a lower surface of the cover member 7, and extends from an outer circumferential portion of the cover member 7 to an inner side of the cover member 7. Moreover, the cover member 7 includes a pair of mounting holes 7b formed at locations corresponding to the mounting holes 6b.

Figure 7:
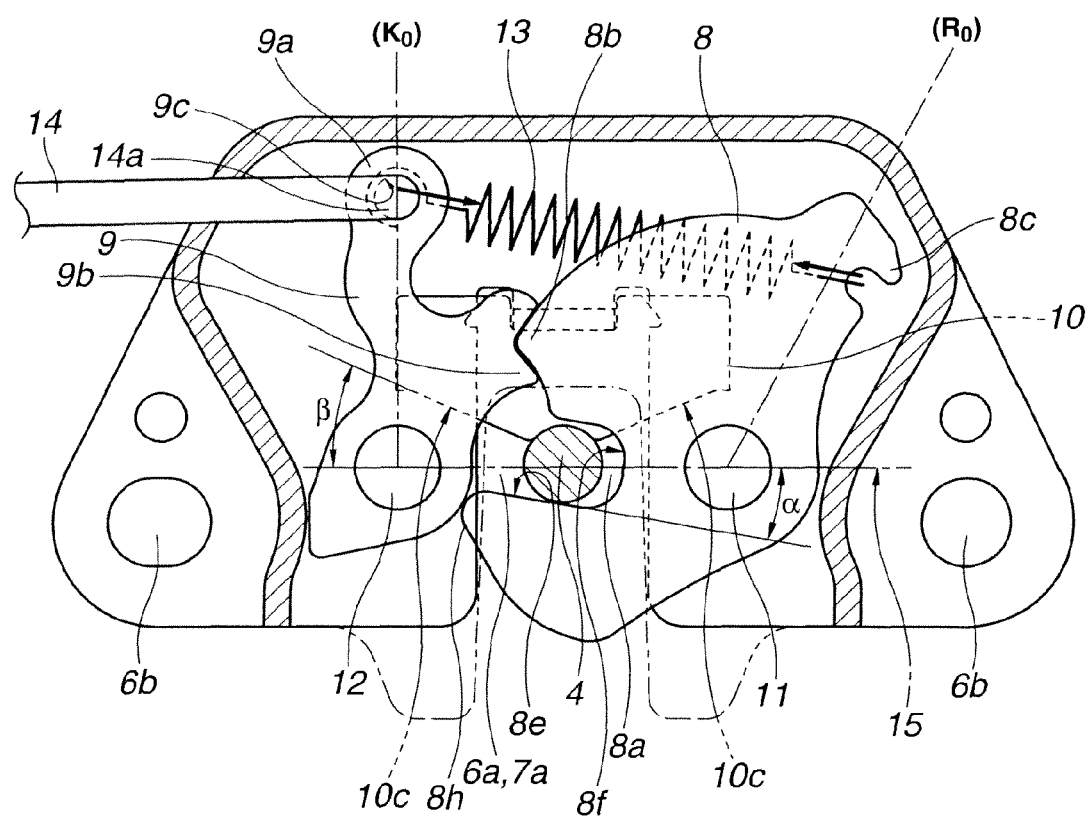
FIG. 7 is a view for explaining operations of the seat locking device under a locked state, according to the embodiment of the present invention.

The latch 8 is formed with a shaft hole 8d. A latch shaft 11 is disposed in the accommodation space and is passed through the shaft hole 8d, so that the latch 8 is provided to be able to rotate. The latch shaft 11 is located in one side portion (a right side portion in FIG. 1) of the accommodation space relative to the entrance concave portion 6a of the base plate 6. The latch 8 is formed with a holding concave portion 8a. The striker 4 which has entered the entrance concave portion 6a enters the holding concave portion 8a, and also departs from the holding concave portion 8a. A spring hanging portion 8c (an imaginary straight line connecting the spring hanging portion 8c with a center of the latch shaft 11) can occupy (move to) a locked position ($R_0$) of FIG. 7 and an unlocked position ($R_1$) of FIG. 9 since the latch 8 rotates about the latch shaft 11. The locked position ($R_0$) is a rotational position under which a part of the latch 8 covers an opening side of the entrance concave portion 7a. The unlocked position ($R_1$) is a rotational position under which the opening side of the entrance concave portion 7a is open. On the other hand, the lock plate 9 is formed with a shaft hole 9d. A lock shaft 12 is disposed in the accommodation space and is passed through the shaft hole 9d, so that the lock plate 9 is provided to be able to rotate. The lock shaft 12 is located in another side portion (a left side portion in FIG. 1) of the accommodation space relative to the entrance concave portion 6a of the base plate 6. Specifically, the latch shaft 11 and the lock shaft 12 are arranged symmetrically to each other with respect to the entrance concave portion 6a. As shown in FIG. 7, the lock plate 9 includes a lock portion 9b. This lock portion 9b restricts the latch 8 from rotating from the locked position ($R_0$) toward the unlocked position ($R_1$) in a counterclockwise direction, by engaging with an engaging portion 8b of the latch 8. A region around an after-mentioned hole 9c of the lock plate 9 (an imaginary straight line connecting a center of the hole 9c with a center of the lock shaft 12) can occupy (move to) a restricting position ($K_0$) of FIG. 7 and a permitting position ($K_1$) of FIGS. 8 and 9 since the lock plate 9 rotates about the lock shaft 12. When the lock plate 9 takes the restricting position ($K_0$), the latch 8 is prevented from rotating from the locked position ($R_0$) of FIG. 7 toward the unlocked position ($R_1$) of FIG. 9 by means of rotationally biasing force of a spring 13 which is applied to the latch 8. When the lock plate 9 takes the permitting position ($K_1$), the latch 8 is permitted to rotate from the locked position ($R_0$) of FIG. 7 to the unlocked position ($R_1$) of FIG. 9 by means of rotationally biasing force of the spring 13 which is applied to the latch 8.

As shown in FIG. 7, the spring 13 is provided as a biasing means for rotationally biasing the latch 8 from the locked position ($R_0$) toward the unlocked position ($R_1$) in the counterclockwise direction and for rotationally biasing the lock plate 9 from the permitting position ($K_1$) toward the restricting position ($K_0$) in the clockwise direction. The lock plate 9 includes an actuating portion 9a for performing an unlock actuation against the biasing of the spring 13. That is, this actuating portion 9a functions to rotate the lock plate 9 from the restricting position ($K_0$) to the permitting position ($K_1$) in the counterclockwise direction against the biasing force of the spring 13. As shown in FIG. 7, a lock releasing rod 14 is provided to include a shaft portion 14a formed at one end portion of the lock releasing rod 14. The shaft portion 14a perpendicularly protrudes from the one end portion of the lock releasing rod 14. This shaft portion 14a is passed through the hole 9c of the actuating portion 9. One end of the spring 13 is hung on the shaft portion 14a, and another end of the spring 13 is hung on the spring hanging portion 8c of the latch 8.

Figure 3A:
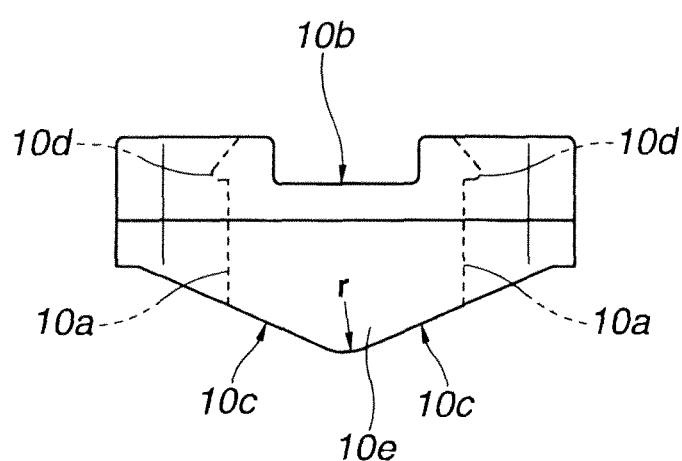
FIG. 3A is a front view of the bumper rubber according to the embodiment of the present invention.
Figure 5A:
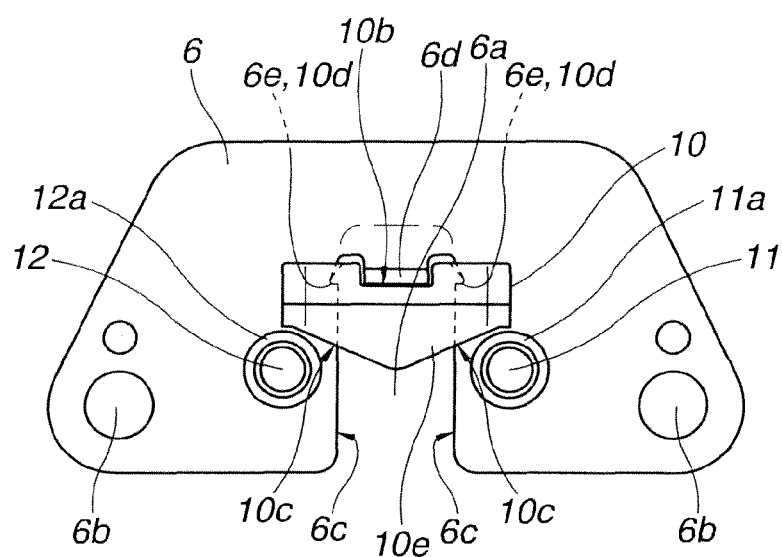
FIG. 5A is a front view of an assembled state where the bumper rubber, the latch shaft and a lock shaft have been attached to the base plate, according to the embodiment of the present invention.
Figure 5C:
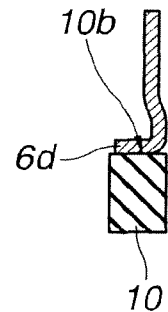
FIG. 5C is an enlarged sectional view of a part of the assembled state.
Figure 5B:
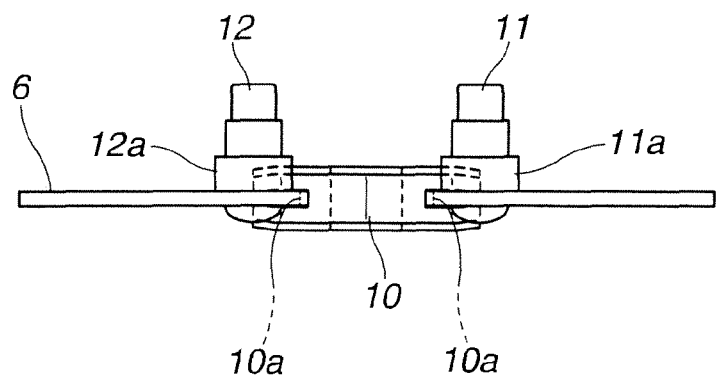
FIG. 5B is a bottom view of the assembled state.

A bumper rubber 10 is mounted on a bottom surface of the entrance concave portion 6a of the base plate 6. The bumper rubber 10 functions to absorb or relieve an impact (shock) when the striker 4 enters the entrance concave portion 6a and the entrance concave portion 7a. As shown in FIG. 3A, the bumper rubber 10 has a shape formed substantially by cutting lower portions of both sides of a rectangular parallelopiped from the rectangular parallelopiped. Each of the both sides of the bumper rubber 10 is formed with a fitting groove 10a. Both edge portions (lateral surfaces) 6c of the entrance concave portion 6a of the base plate 6 respectively enter the fitting grooves 10a of the both sides of the bumper rubber 10. Bottom surfaces of the fitting grooves 10a of the both sides of the bumper rubber 10 are approximately parallel to each other. In a side of the bumper rubber 10 which faces the bottom surface of the entrance concave portion 6a, i.e., in a center portion of an upper portion of the bumper rubber 10 in FIG. 3A, a concave portion 10b is formed. The base plate 6 includes a rubber receiving portion 6d, and this rubber receiving portion 6d is fitted into the concave portion 10b. As shown in FIGS. 5A to 5C, the rubber receiving portion 6d is formed by bending a portion slit when forming the entrance concave portion 6a in the base plate 6, inwardly in a direction perpendicular to the base plate 6. That is, as shown in FIG. 5C, a portion of the base plate 6 which is left by cutting the base plate 6 along the edge portions 6c of the entrance concave portion 6a when forming the entrance concave portion 6a is bent to extend its tip portion 6d toward the cover member 7 in the direction perpendicular to the base plate 6.

As shown in FIG. 7, a lateral surface 8e of the holding concave portion 8a prevents the striker 4 from departing from the entrance concave portion 6a and the entrance concave portion 7a under a locked state. An opening side of this lateral surface 8e of the holding concave portion 8a is located closer to the bottom surface of the entrance concave portion 6a than a counter-opening side of the lateral surface 8e under the locked state. That is, under the locked state, the lateral surface 8e of the holding concave portion 8a is inclined by an amount a with respect to an imaginary reference line 15 passing through the shaft center of the latch shaft 11 and the shaft center of the lock shaft 12.

Figure 3B:
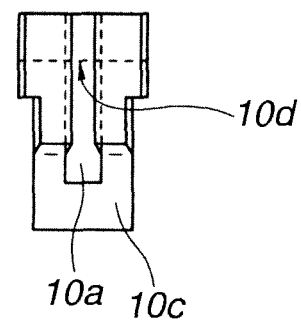
FIG. 3B is a right side view of the bumper rubber.
Figure 3C:
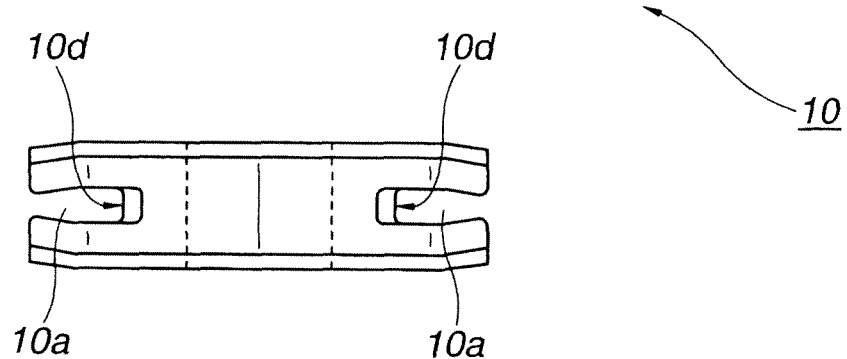
FIG. 3C is a bottom view of the bumper rubber.

As shown in FIGS. 3A to 3C, a substantially isosceles-triangle portion 10e is formed in a portion of the bumper rubber 10 which is closer to an opening side of the entrance concave portion 6a. This substantially isosceles-triangle portion 10e has a vertex located on a center line of the entrance concave portion 6a. This vertex (and its surroundings) of the substantially isosceles-triangle portion 10e is formed in an arc shape having a radius dimension r so as to smoothly connect left and right oblique surfaces 10c of the substantially isosceles-triangle portion 10e with each other.

Figure 1:
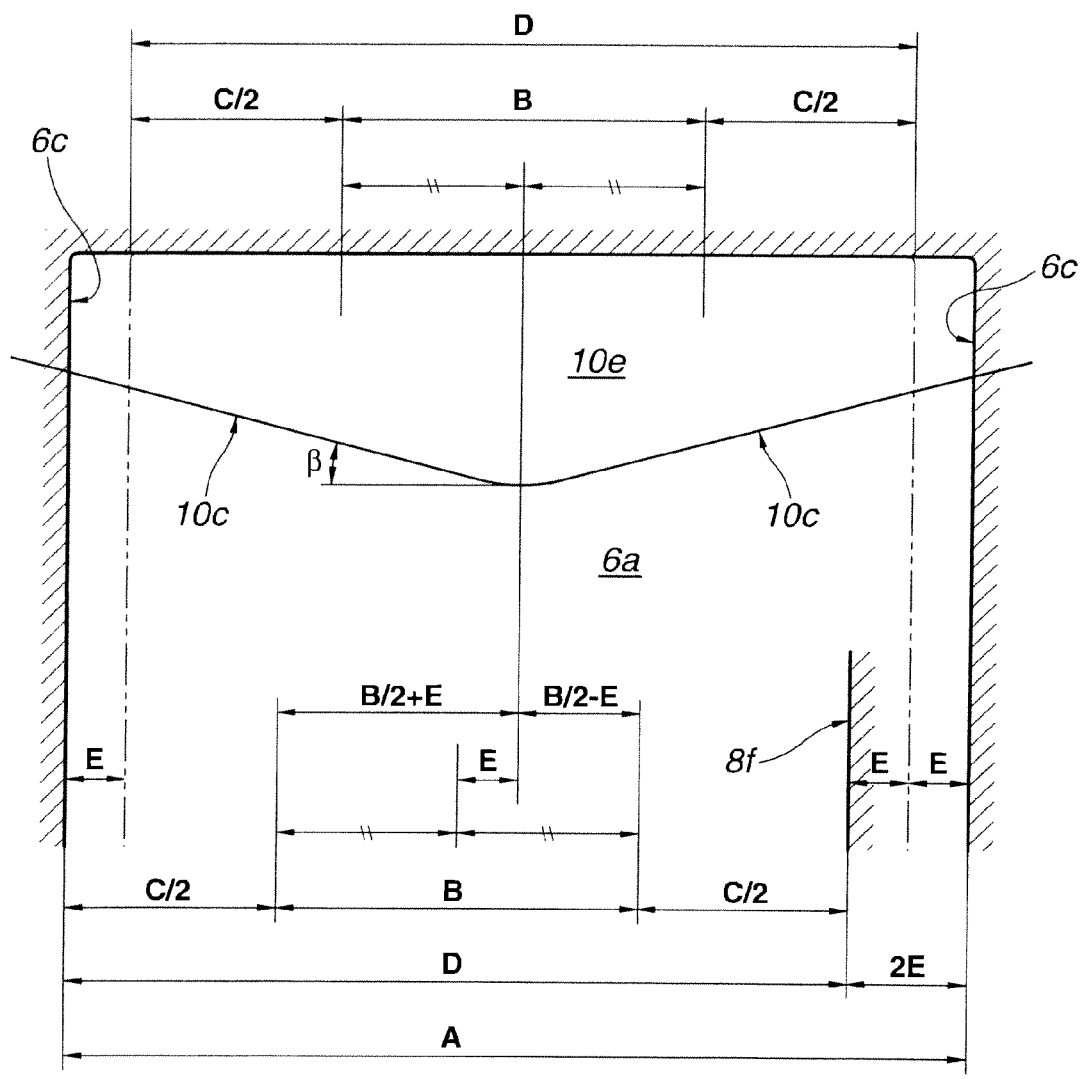
FIG. 1 is an explanatory view showing a relation among an entrance concave portion, a bumper rubber and a latch according to an embodiment of the present invention.
Figure 2A:
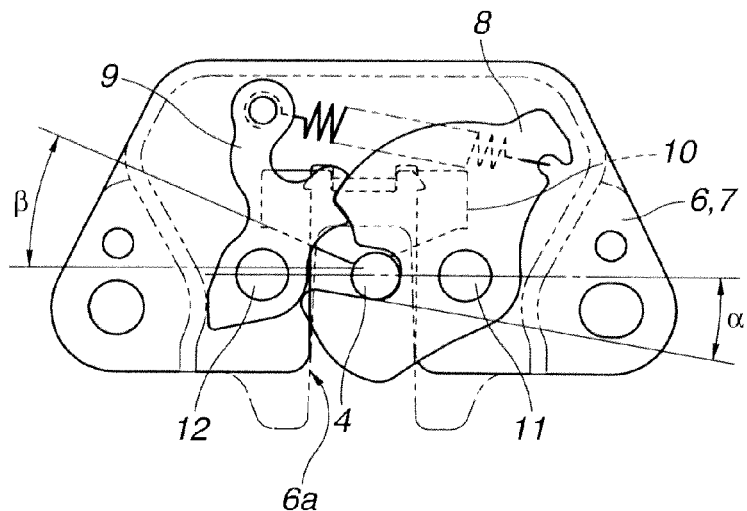
FIG. 2A to 2C are explanatory views respectively showing states where a striker has different distances from a latch shaft with respect to a width direction of the entrance concave portion, according to the embodiment of the present invention.
Figure 2B:
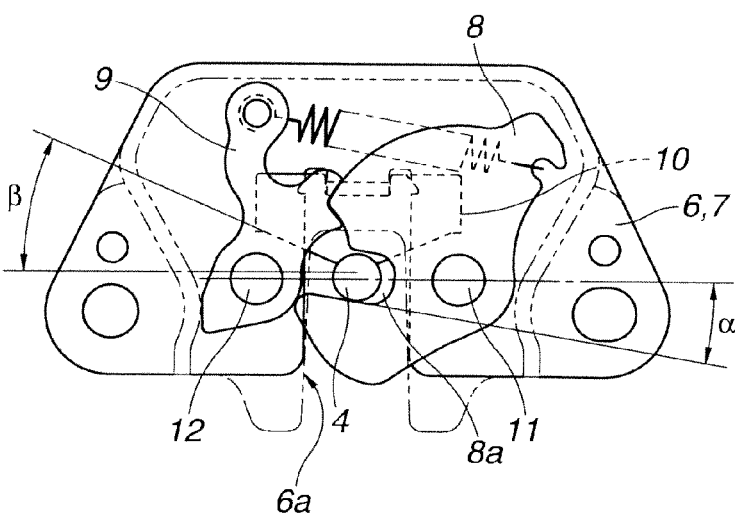
Figure 2C:
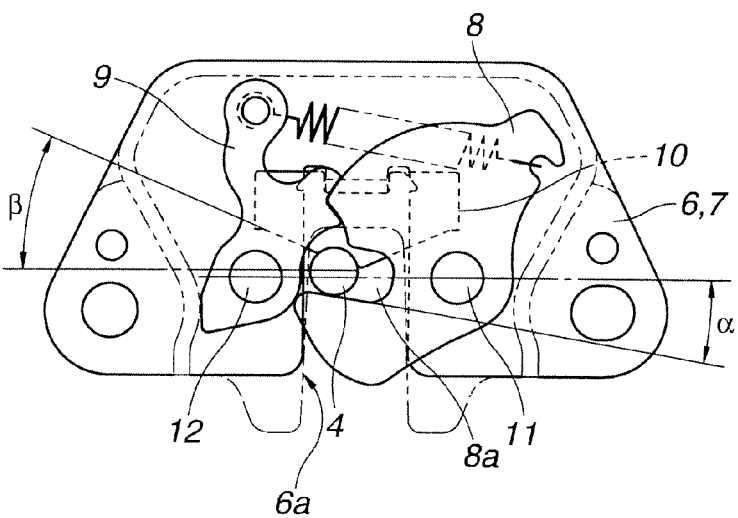

A width dimension A of the entrance concave portion 6a into which the bumper rubber 10 is installed is set as follows. FIG. 1 is an explanatory view showing a relation among the entrance concave portion 6a, the bumper rubber 10 and a bottom surface 8f of the holding concave portion 8a of the latch 8. A range of a catching-capable dimension (length) D shown by lead lines (=alternate-long-and-two-short-dashes lines) in an upper part of FIG. 1 is an inherently-required location of lateral surfaces of the entrance concave portion. In this embodiment according to the present invention, the lateral surfaces 6c and 6c of the entrance concave portion 6a are set at outside locations by a dimension E from the range of the catching-capable dimension D shown by the lead lines in the upper part of FIG. 1. Thereby, the width dimension A of the entrance concave portion 6a is given as shown by FIG. 1. It is noted that the catching-capable dimension D is a width which enables the striker 4 to be caught. The catching-capable dimension D can be obtained by adding a catching-capable distance B to an outer diameter dimension C of the striker 4, as D=B+C. This catching-capable distance 13 is a distance that needs to be secured in design as a deviation of shaft center location of the striker 4 (i.e., an extending center line of the rod-like member of the striker 4) in order to catch the striker 4 when the striker 4 enters the entrance concave portion 6a.

In this embodiment, the bottom surface 8f of the holding concave portion 8a is set at a location closer to the center line of the entrance concave portion 6a by the dimension E than the above-mentioned inherently-required location of lateral surface shown by the right alternate-long-and-two-short-dashes line in FIG. 1. As a result, the location of the bottom surface 8f defines a right end of a new catching-capable dimension D which is shown by lead lines in a lower part of FIG. 1. That is, whole of the range of the catching-capable dimension D moves to the left by the dimension E from the inherently-required location of lateral surfaces, in FIG. 1. Hence, a center line of the catching-capable dimension D moves to the left by the dimension E from the center line of the entrance concave portion 6a, and thereby, has a distance of the dimension E from the center line of the entrance concave portion 6a in this embodiment.

In order to design the base plate 6 including the entrance concave portion 6a and the bumper rubber 10 as common components that can be used for both of the left and right seat locking devices 3, it is necessary that the entrance concave portion 6a of the base plate 6 is symmetrical with respect to the base plate 6 (i.e., with respect to a center line of the base plate 6). Therefore, since the location of the left end of the catching-capable dimension D is shifted from its inherently-required location (i.e., from the left alternate-long-and-two-short-dashes line) to the left by the dimension E so that the left end of the catching-capable dimension D is located at the left lateral surface 6c; the right lateral surface 6c is also set by being shifted from its inherently-required location (i.e., from the right alternate-long-and-two-short-dashes line) to the right by the dimension E. Thereby, the width dimension A of the entrance concave portion 6a is equal to the sum of the catching-capable dimension D and the two dimensions E and E (A=D+2E). That is, in this embodiment, the catching-capable dimension D for the striker 4 is given between the left lateral surface 6c of the entrance concave portion 6a and the bottom surface 8f of the holding concave portion 8a when the latch 8 takes the locked position ($R_O$). In other words, in this embodiment, the catching-capable dimension D is set at an off-centered location toward the left with respect to the width dimension A of the entrance concave portion 6a.

An inclination angle of the oblique surface 10c of the substantially isosceles-triangle portion 10e of the bumper rubber 10 is set at a value greater than the inclination angle $\alpha$ of the lateral surface 8e of the holding concave portion 8a that functions to prevent the striker 4 from departing (moving away) from the entrance concave portion 6a. That is, as shown in FIG. 7, the inclination angle $\alpha$ of the lateral surface 8e of the holding concave portion 8a relative to the reference line 15 passing through the shaft center of the latch shaft 11 and the shaft center of the lock shaft 12 satisfies a relation of $\alpha<\beta$ when the inclination angle of the oblique surface 10c of the substantially isosceles-triangle portion 10e of the bumper rubber 10 is denoted by $\beta$.

In this embodiment according to the present invention, when the striker 4 enters the entrance concave portion 6a so as to rotate the latch 8 to the locked position ($R_O$), a restoring force of the bumper rubber 10 compressed by the striker 4 has a substantially identical value even if the striker 4 exists at any locations inside the entrance concave portion 6a relative to a width direction of the entrance concave portion 6a. A rotational force which is trying to rotate the latch 8 in the unlocking direction is constantly applied to the latch 8 by the biasing force of the spring 13. Hence, the striker 4 rotates the latch 8 up to the locked position ($R_O$) against the biasing force of the spring 13. At this time, since the striker 4 is engaged with the holding concave portion 8a to have a clearance therebetween (i.e., an inner diameter of the holding concave portion 8a is slightly larger than an outer diameter of the striker 4), it is necessary that the striker 4 is pushed into the entrance concave portion 6a further deeply by this clearance in order to rotate the latch 8 up to the locked position ($R_O$). As a point at which the striker 4 presses the latch 8 becomes more distant from the latch shaft 11, the striker 4 needs to be pushed toward the bottom of the entrance concave portion 6a more deeply. At this time, assuming that the bumper rubber 10 has a contact surface (lower surface) perpendicular to a depth direction of the entrance concave portion 6a, as the striker 4 is pushed toward the bottom of the entrance concave portion 6a more deeply, the bumper rubber 10 is deformed more greatly so that the restoring force of the bumper rubber 10 becomes larger. Contrary to this, in this embodiment according to the present invention, the above mentioned relation: $\alpha<\beta$ is satisfied. Hence, when the striker 4 presses and pushes the latch 8 up to the locked position ($R_O$) at a location near the opening side of the holding concave portion 8a, an amount of compressive deformation of the bumper rubber 10 is reduced so that the restoring force of the bumper rubber 10 is reduced although a pushed amount of the striker 4 is increased in the entrance concave portion 6a. That is, the value $\beta$ relative to the value $\alpha$ is set in such a manner that a pressing force level of the striker 4 when rotating the latch 8 in the direction toward the locked position ($R_O$) is approximately same even if the striker 4 exists at any width-directional location inside the entrance concave portion 6a. In one example of this embodiment, for example, when the inclination angle $\alpha$ was set at 10 degrees ($\alpha=10°$), the inclination angle $\beta$ was set at 23 degrees ($\beta=23°$). In this case, it was confirmed that the value of pressing force (pushing force) of the striker 4 at the time of locking operation was substantially constant even if the striker 4 existed at any width-directional locations inside the entrance concave portion 6a. The value of inclination angle $\beta$ is determined according to the shape of the holding concave portion 8a, a positional relation between the latch shaft 11 and the holding concave portion 8a, the value of inclination angle $\alpha$, a material of the bumper rubber 10, or the like.

Figure 6:
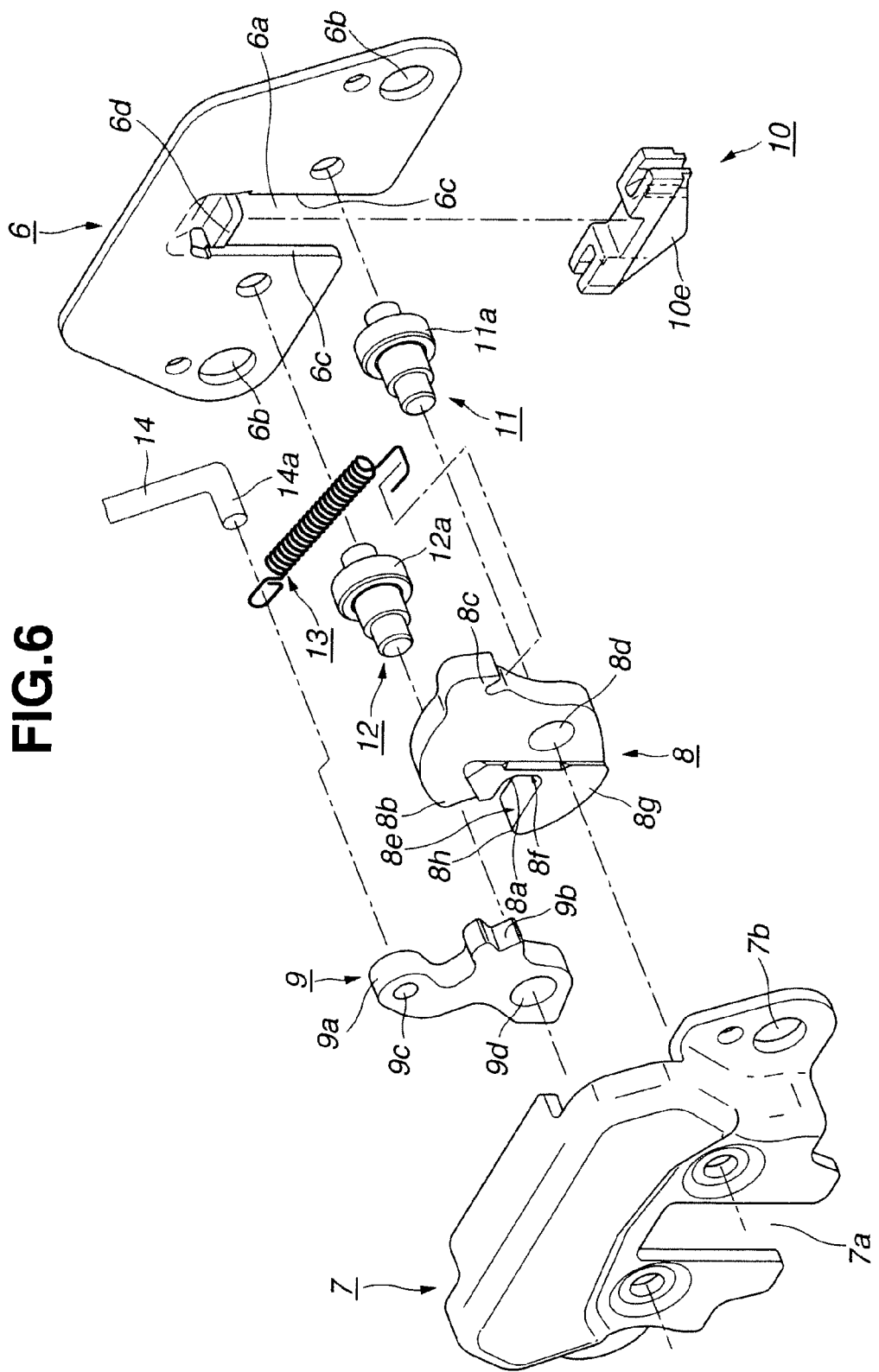
FIG. 6 is an exploded oblique-perspective view of a seat locking device according to the embodiment of the present invention.

As shown in FIG. 6, a coating resin 8g is molded to the holding concave portion 8a (and its surrounding portion) of the latch 8. When the latch 8 has an excessive stroke (overstroke), i.e., when the latch 8 is rotated excessively, a tip portion 8h of the lower lateral surface 8e of the holding concave portion 8a of the latch 8 becomes in contact with the lock plate 9 and thereby stops the excessive rotation. This tip portion 8h is coated with resin by the coating resin 8g.

Each of the base plate 6, the cover member 7 and the bumper rubber 10 is formed in a shape symmetrical with respect to the center line (that is parallel to the depth direction, i.e., perpendicular to the width direction) of the entrance concave portion 6a or the entrance concave portion 7a. Moreover, each of the lock plate 9 and the latch 8 is formed in a shape symmetrical along an axial direction of the lock shaft 12 or the latch shaft 11, i.e., symmetrical with respect to a center line (that is perpendicular to the axial direction) of the lock plate 9 or the latch 8.

Figure 4:
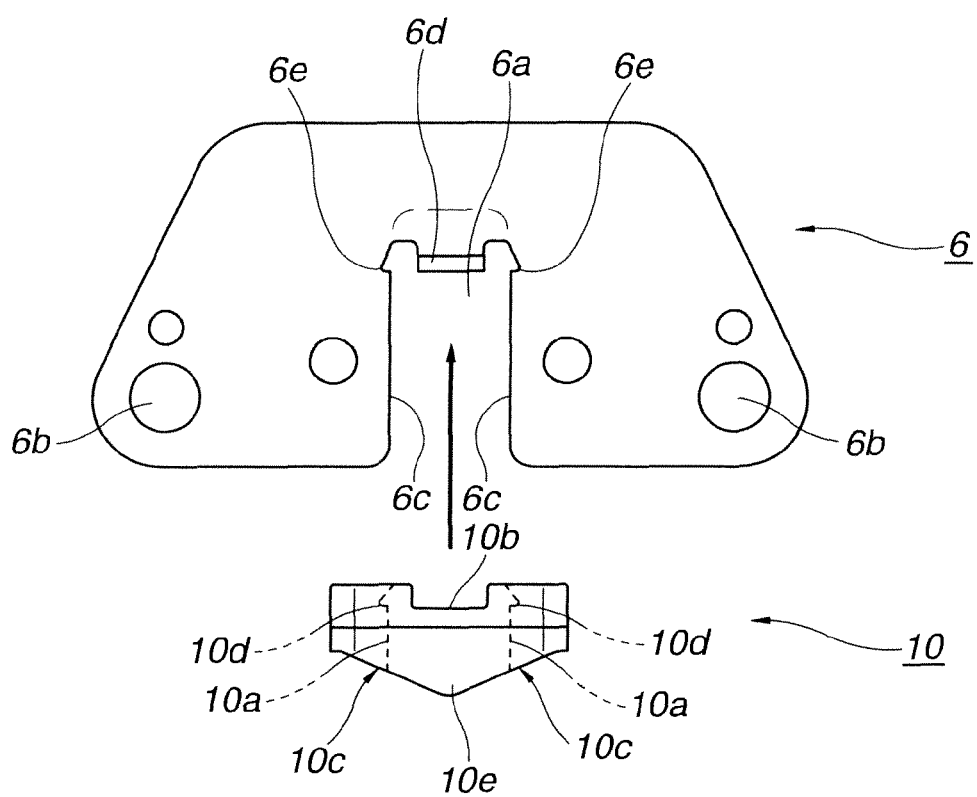
FIG. 4 is an explanatory view showing a state when the bumper rubber is attached to a base plate, according to the embodiment of the present invention.

As shown in FIG. 4, the base plate 6 includes a pair of concave portions 6e near the bottom surface of the entrance concave portion 6a. That is, the pair of concave portions 6e are formed respectively in both the lateral surfaces 6c of the entrance concave portion 6a, to be depressed in the width direction of the entrance concave portion 6a. On the other hand, the bumper rubber 10 includes a pair of convex portions 10d which are formed on the bottom surfaces of the left and right fitting grooves 10a. Each of the pair of convex portions 10d protrudes from the bottom surface of the left or right fitting groove 10a in the width direction of the entrance concave portion 6a. By engaging the pair of concave portions 6e with the pair of convex portions 10d, the bumper rubber 10 is fixed to the bottom surface of the entrance concave portion 6a.

(Operations)

Figure 8:
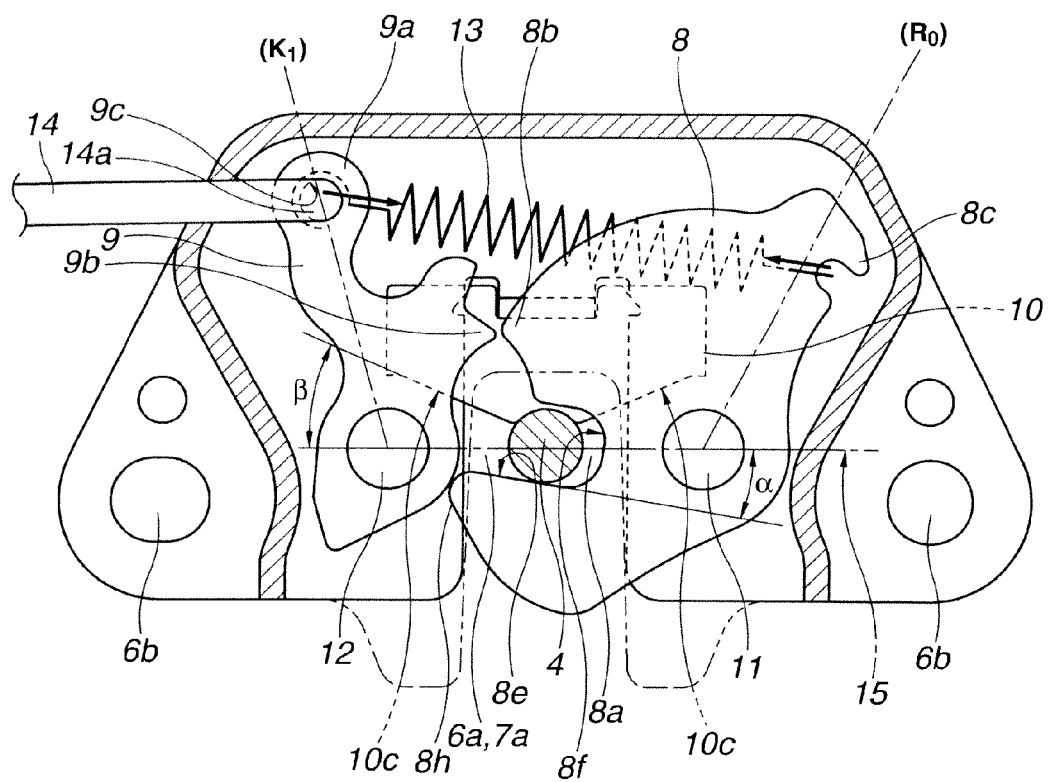
FIG. 8 is a view for explaining operations of the seat locking device at the time of unlocking, according to the embodiment of the present invention.
Figure 9:
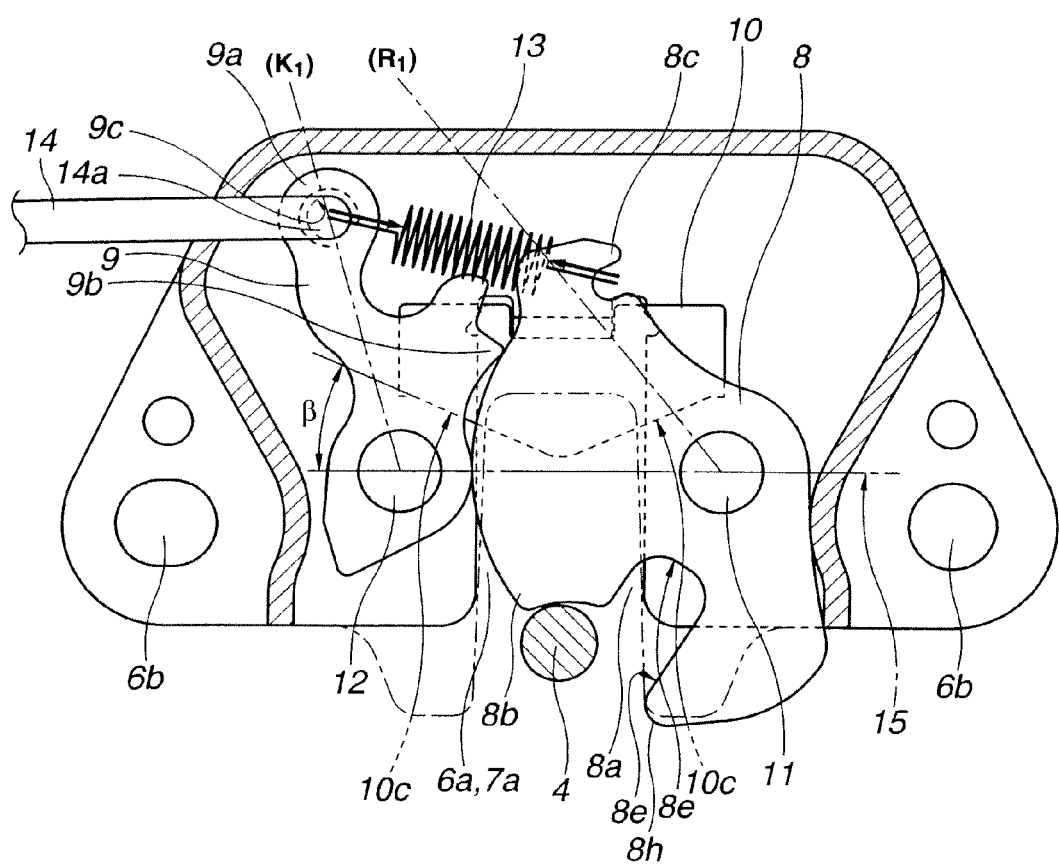
FIG. 9 is a view for explaining operations of the seat locking device at the time of release of the striker, according to the embodiment of the present invention.

Next, operations of the seat locking device will now be explained. As shown in FIG. 7, under a state where the latch 8 is in the locked position ($R_O$) and the lock plate 9 is in the restricting position ($K_O$) so that the lock portion 9b of the lock plate 9 is engaged with the engaging portion 8b of the latch 8; the biasing force of the spring 13 biases or urges the latch 8 toward the unlocked position ($R_1$) as shown by an arrow and also biases or urges the lock plate 9 toward the restricting position ($K_O$) as shown by another arrow. Hence, the striker 4 is sandwiched between the lower lateral surface 8e of the holding concave portion 8a of the latch 8 and the lower surface of the bumper rubber 10 so that the striker 4 is held inside the entrance concave portion 6a and the entrance concave portion 7a. Next, the lock releasing rod 14 is operated and moved in the left in FIG. 7, the actuating portion 9a moves in the left against the biasing force of the spring 13. Thereby, the lock plate 9 rotates from the restricting position ($K_O$) in the counterclockwise direction, and takes the permitting position ($K_1$). Thereby, as shown in FIG. 8, the lock portion 9b of the lock plate 9 is disengaged from the engaging portion 8b of the latch 8. Then, the latch 8 rotates in the counterclockwise direction up to the unlocked position (R₁) by means of biasing force of the spring 13, as shown in FIG. 9. Thereby, the striker 4 is removed from the holding concave portion 8a and the entrance concave portions 6a and 7a. That is, the striker 4 is released from the catching means 5.

According to this embodiment of the present invention, under the locked state, the lateral surface 8e of the holding concave portion 8a is inclined such that the opening-side portion of the lateral surface 8e of the holding concave portion 8a is nearer to the bottom surface of the entrance concave portion 6a than the counter-opening-side portion (portion adjacent to the bottom surface 8f) of the is lateral surface 8e. Accordingly, if a load is applied to the striker 4 in the direction that tries to remove the striker 4 from the entrance concave portion 6a, the striker 4 moves along the lateral surface 8e of the holding concave portion 8a toward the bottom surface 8f of the holding concave portion 8a, so that the striker 4 approaches the latch shaft 11. Thereby, an arm length of a torque for rotating the latch 8 in the unlocking direction is reduced, so that the torque of the latch 8 which tries to be rotated in the unlocking direction is reduced. Moreover, the bumper rubber 10 is installed so as to cause a center line (passing through the vertex) of the substantially isosceles-triangle portion 10e to completely overlap with the (depth-directional) center line of the entrance concave portion 6a. The center line (passing through the midpoint) of the catching-capable dimension D for the striker 4 is a little eccentric (i.e., deviated) from the center line of the entrance concave portion 6a toward the opening side of the holding concave portion 8a. Accordingly, the left oblique surface 10c which is located on the opening side of the holding concave portion 8a occupies much range within the catching-capable dimension D for the striker 4. That is, the left oblique surface 10c overlaps with a larger part of the catching-capable dimension D than an overlapping part of the right oblique surface 10c, in the depth direction of the entrance concave portion 6a. It is noted that this left oblique surface 10c is one of the two oblique surfaces 10c of the substantially isosceles-triangle portion 10e of the bumper rubber 10, which is inclined in the same direction as that of the lateral surface 8e of the holding concave portion 8a under the locked state. At the time of locking operation, the bumper rubber 10 is compressed and deformed by the striker 4. Thereby, the bumper rubber 10 produces the restoring force acting in the direction that pushes out the striker 4 from the entrance concave portion 6a. At this time, a variation of level of the restoring force is small according to the structure of this embodiment.

That is, in a case that the striker 4 is located on the right oblique surface 10c existing on the counter-opening side (bottom side) of the holding concave portion 8a, the restoring force which is caused from the compressive deformation of the bumper rubber 10 by the striker 4 and which acts in the direction that pushes out the striker 4 from the entrance concave portion 6a is smaller than that in a case that the striker 4 is located on the vertex of the substantially isosceles-triangle portion 10e. However, this restoring force does not make much difference from the restoring force in the case that the striker 4 is located on the vertex, if the striker 4 is located near the vertex of the substantially isosceles-triangle portion 10e. Therefore, in this embodiment, the center line of the catching-capable dimension D for the striker 4 is somewhat shifted from the center line of the entrance concave portion 6a toward the opening side of the holding concave portion 8a in such a manner that the striker 4 is not moved from a region near the vertex of the substantially isosceles-triangle portion 10e toward the counter-opening side (toward further right side) of the right oblique surface 10c. Accordingly, the restoring force which is caused from the compressive deformation of the bumper rubber 10 and which acts in the direction that pushes out the striker 4 has a small variation in magnitude. It is noted that the right oblique surface 10c is another of the two oblique surfaces 10c of the substantially isosceles-triangle portion 10e of the bumper rubber 10, which is inclined in the direction opposite to the inclination direction of the lateral surface 8e of the holding concave portion 8a (with respect to the center line of the entrance concave portion 6a) under the locked state.

According to the seat locking device in this embodiment, under the locked state, the lateral surface 8e of the holding concave portion 8a is inclined relative to the reference line 15 in such a manner that the opening side of the lateral surface 8e of the holding concave portion 8a is closer to the bottom surface of the entrance concave portion 6a than the counter-opening side (the bottom side) of the lateral surface 8e. Accordingly, if a load occurs in the direction that tries to detach the catching means 5 from the striker 4, the striker 4 moves toward the bottom surface 8f of the holding concave portion 8a, so that a distance between the striker 4 and the latch shaft 11 becomes smaller. Thereby, an arm length of a torque which tries to rotate the latch 8 in the lock-releasing direction becomes smaller. Hence, a strength of the latch 8 can be designed in a condition where the striker 4 exists on or near the bottom surface 8f of the holding concave portion 8a. That is, an axial thickness of the latch 8 can be made small so that the seat locking device can be downsized. Moreover, in this embodiment, the center line (passing through the vertex) of the substantially isosceles-triangle portion 10e is set to completely overlap with the (depth-directional) center line of the entrance concave portion 6a as viewed in the axial direction. Accordingly, the components can be used for the catching means (catching sections) 5 that are provided at both of the left and right portions of the seat, as commoditized components.

According to the this embodiment of the present invention, when the striker 4 rotates the latch 8 up to the locked position (R₀) for the locking operation, the bumper rubber 10 is compressed and deformed by the striker 4 and thereby produces the restoring force. At this time, the restoring force is a substantially constant irrespective of the width-directional position of the striker 4 within the entrance concave portion 6a. That is, an amount (displacement) by which the striker 4 has moved until the latch 8 reaches the locked position (R₀) is larger as the distance between the latch shaft 11 and the striker 4 becomes longer. However, in this embodiment, a deformation amount by which the striker 4 compressively deforms the bumper rubber 10 can be made smaller as the distance between the latch shaft 11 and the striker 4 becomes longer, because the inclination angle of each oblique surface 10c of the substantially isosceles-triangle portion 10e of the bumper rubber 10 is set at a larger value than that of the lateral surface 8e of the holding concave portion 8a. Therefore, the pressing force of the striker 4 necessary to rotate the latch 8 up to the locked position (R₀) can be approximately constant irrespective of the position of the striker 4 with respect to the width direction of the entrance concave portion 6a. In other words, the pushing force for pushing the catching means 5 to relatively move the striker 4 into the entrance concave portion 6a for the locking operation is approximately constant irrespective of the width-directional position of the striker 4 in the entrance concave portion 6a.

According to the this embodiment of the present invention, if the latch 8 has an excessive stroke, i.e., if the latch 8 further rotates beyond the locked position (R₀), the tip portion 8h of the lower lateral surface 8e of the holding concave portion 8a of the latch 8 becomes in contact with the lock plate 9 so that the rotation of the latch 8 is stopped. This tip portion 8h falls within a range of the coating resin 8g for coating the latch 8. Therefore, a clash (hit) between two metals can be avoided. Hence, a clash noise can be relieved when a load is applied to the seat.

According to the seat locking device in this embodiment, the lock plate 9 itself is used as a stopper that is workable when the latch 8 excessively rotates by press of the striker 4. The part of the latch 8 which becomes in contact with the lock plate 9 is coated with the resin. Therefore, it is not necessary to add any component as the stopper.

According to the this embodiment, even in a case that two seat locking devices having shapes bilaterally symmetric to each other are provided to left and right portions of a vehicle seat with respect to a gravity direction; the base plate 6, the cover member 7, the bumper rubber 10, the latch 8 and the lock plate 9 can be used as common components for both of the left and right locking devices.

According to the seat locking device in this embodiment, all the symmetrically-shaped components can be used as common components between two seat locking devices arranged in left and right side of the seat. Therefore, the number of components can be reduced so that the seat including the seat locking devices can be manufactured at a low cost.

This application is based on prior Japanese Patent Application No. 2011-77271 filed on Mar. 31, 2011. The entire contents of this Japanese Patent Applications are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat locking device comprising:
a striker fixed to a vehicle body; and
a catching section provided to a seat and configured to catch the striker, the catching section including
a base plate which has a first entrance concave portion at an approximately middle location of the base plate, the first entrance concave portion being formed from an outer circumferential portion of the base plate toward an inner side of the base plate,
a cover member which is disposed to form an accommodation space between the base plate and the cover member, and which has a second entrance concave portion at an approximately middle location of the cover member, the second entrance concave portion being formed from an outer circumferential portion of the cover member toward an inner side of the cover member, the striker being configured to enter and depart from the first and second entrance concave portions,
a latch rotatably provided in the accommodation space by a latch shaft and configured to take a locked position and an unlocked position, the striker being configured to enter the first and second entrance concave portions and a holding concave portion formed in the latch when the latch takes the locked position and configured to depart from the first and second entrance concave portions and the holding concave portion when the latch takes the unlocked position, the holding concave portion being configured to prevent the striker from departing from the first and second entrance concave portions when the latch is in the locked position,
a lock plate rotatably provided in the accommodation space by a lock shaft and configured to provide a restricting position for preventing the latch from rotating from the locked position to the unlocked position and a permitting position for permitting the latch to rotate from the locked position to the unlocked position, the latch shaft and the lock shaft being arranged symmetrically to each other with respect to the first entrance concave portion, and
a bumper rubber mounted on a bottom surface of the first entrance concave portion of the base plate and configured to relieve an impact when the striker enters the first entrance concave portion,
wherein the bumper rubber includes a substantially isosceles-triangle portion at its portion closer to an opening side of the first entrance concave portion, and the substantially isosceles-triangle portion has a vertex located on an imaginary center line of the first entrance concave portion,
wherein a lateral surface of the holding concave portion is inclined from an imaginary reference line passing through on a shaft center of the latch shaft and a shaft center of the lock shaft in such a manner that an opening side of the lateral surface of the holding concave portion is located closer to the bottom surface of the first entrance concave portion than a counter-opening side of the lateral surface of the holding concave portion when the latch is in the locked position,
wherein a width dimension of the first entrance concave portion is larger than a catching-capable dimension for the striker that is a sum of a catching-capable distance for an imaginary center line of the striker and an outer diameter dimension of the striker,
wherein a bottom surface of the holding concave portion is located closer to the imaginary center line of the first entrance concave portion than one lateral surface of the first entrance concave portion so that the catching-capable dimension is set between the bottom surface of the holding concave portion and another lateral surface of the first entrance concave portion, when the latch is in the locked position.

2. The seat locking device according to claim 1, wherein an oblique surface of the substantially isosceles-triangle portion of the bumper rubber has an inclination angle larger than an inclination angle of the lateral surface of the holding concave portion preventing the striker from departing from the first entrance concave portion.

3. The seat locking device according to claim 1, wherein at least a part of the holding concave portion of the latch is coated by resin, and
when the latch excessively rotates by being pressed by the striker, the resin-coated part of the latch becomes in contact with the lock plate to restrict the rotation of the latch.

4. The seat locking device according to claim 1, wherein each of the base plate, the cover member and the bumper rubber is formed in a shape symmetrical with respect to the imaginary center line of the first entrance concave portion, and
each of the latch and the lock plate is formed in a symmetrical shape in an axial direction thereof.

* * * * *